H. L. HAPGOOD.

Sand Papering Machines.

No. 5,915. Reissued June 16, 1874.

Witnesses,
Wm. P. Edwards
L. A. Brown.

Inventor,
Herbert L. Hapgood
by his attorney
N. C. Lombard

UNITED STATES PATENT OFFICE.

HERBERT L. HAPGOOD, OF ATHOL, MASSACHUSETTS.

IMPROVEMENT IN SANDPAPERING-MACHINES.

Specification forming part of Letters Patent No. 142,626, dated September 9, 1873; reissue No. 5,915, dated June 16, 1874; application filed April 13, 1874.

*To all whom it may concern:*

Be it known that I, HERBERT L. HAPGOOD, of Athol, in the county of Worcester and State of Massachusetts, have invented certain new and useful Improvements in Sandpapering-Machines, of which the following, taken in connection with the accompanying drawings, is a specification:

My invention relates to a machine for smoothing wood-work by means of a cylinder covered with sand-paper, arranged to run at a high rate of speed, and particularly to the construction of the cylinder, and is applicable especially to smoothing the edges of many parts of various articles of furniture, and particularly such parts as are curved or irregular in form, they being applied to this machine just as they come from the jig-saw, the cylinder also being applicable to various other kinds of work, such, for instance, as buffing the soles of boots and shoes; and the first part of my invention relates especially to the envelope of abrading material; and it consists in the use of a tube or hollow cylinder of sand-paper, made by bending a flat sheet of the same into the form of a tube, and uniting its contiguous edges by means of glue or other suitable adhesive material, said tube to be mounted upon and secured to any suitable core or foundation, to be run at a high rate of speed. The second part of my invention relates to the construction of the core or foundation-cylinder, to receive the tube of abrading material; and it consists in the use, in combination with an envelope of sand-paper in the form of a hollow cylinder, of a rubber tube, placed within said tube, and so arranged, with relation to two annular cup-shaped heads, of metal or other suitable material—one of which is fixed upon the shaft, and the other adjustable—that, by the adjustment of the distance between said heads, said rubber tube will be compressed longitudinally, and thereby expanded laterally, and made to fill the tube of abrading material tightly, and thus effectually prevent it from slipping upon the rubber.

Figure 1:
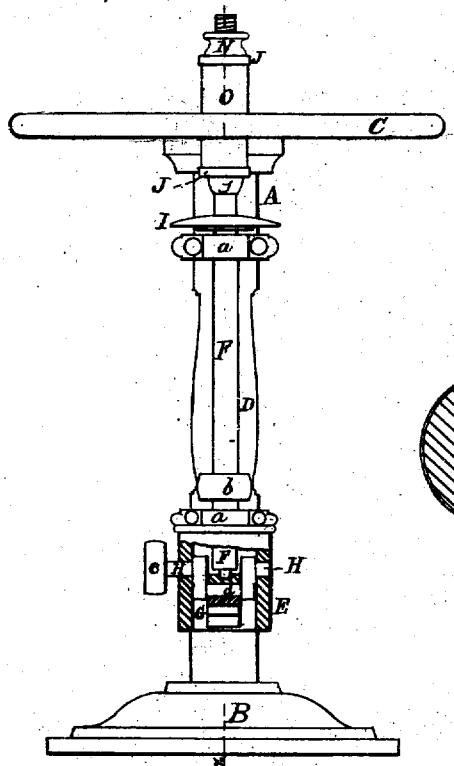
Figure 2:
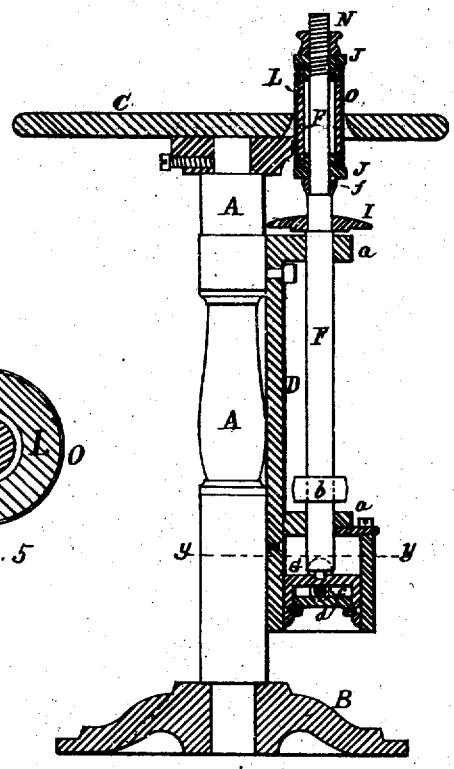
Figure 5:
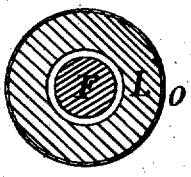
Figure 3:
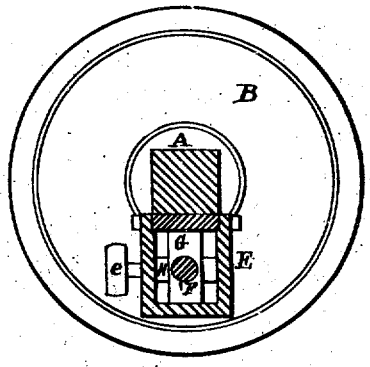
Figure 4:
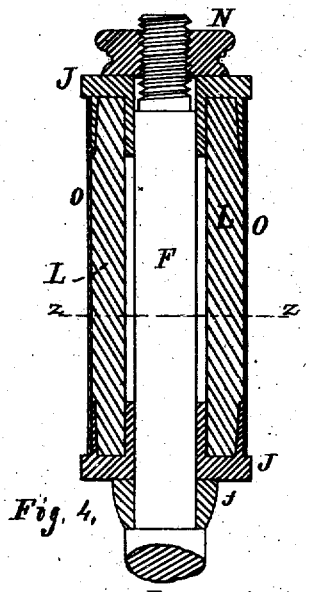

In the drawings, Figure 1 is a front elevation of a machine embodying my invention, with a portion in section. Fig. 2 is a vertical section on line *x x* on Fig. 1. Fig. 3 is a transverse section on line *y y* on Fig. 1. Fig. 4 is a longitudinal section of the abrading-cylinder, drawn to an enlarged scale; and Fig. 5 is a transverse section of the same on line *z z*.

A is a column, provided with an enlarged base-flange, B, and having secured to its top the table C. D is a stand, bolted or otherwise secured to one side of the column A, and provided with the boxes *a a*, and having formed in its lower end, or secured thereto, the hollow chamber E. F is a shaft, mounted in bearings *a a*, in such a manner that it may be revolved therein, while at the same time it may be moved endwise therein, said shaft being provided with the pulley *b*, by means of which and a belt rotary motion may be imparted thereto. In the chamber E, and fitted to slide vertically therein, is the yoke or cross-head G, provided with the slot *c*, in which the crank-pin *d* works, and, by its rotation, imparts to said cross-head a reciprocating motion in a vertical direction, and, as the lower end of the shaft F is stepped upon said cross-head, it must partake of said reciprocating motion. The crank-pin *d* is formed in or secured to the shaft H, which has its bearings in the sides of the chamber E, and is provided with the pulley *e*, by which rotary motion is imparted thereto. A cam may be used instead of the crank-pin *d*, if desired. I is a circular disk or collar, secured to the shaft F just above the upper bearing *a*, when the shaft is in its lowest position, for the purpose of protecting said bearing from the sand and grit thrown off from the abrading-cylinder. J J are two collars, placed upon the shaft F a distance apart about equal to the desired length of the cylinder, for carrying the sand-paper. Each of said collars J is provided with an annular groove formed in one end, and said collars are put upon the shaft F with said grooved ends toward each other, and with said grooves fitting over the ends of the rubber tube L, surrounding the upper portion of said shaft and between said collars. The lower collar J rests upon the shoulder *f* on the shaft F, while the upper one is adjustable by means of the nut N. O is a tube of sand-paper, of the proper diameter to fit the outside of the collar J, and formed by bending a sheet of sand-paper into the form of a cylinder and securing its edges together, as shown. The rubber tube L is of such a diameter as to fit loosely into the tube of sand-paper; but when placed in position between the two collars J J, by turning down the nut N it will be compressed longitudinally and expanded transversely, so as to completely fill the tube of sand-paper and hold it firmly in position. A thin ring of metal, forming the outside wall of the annular groove formed in the collars J, is interposed between the rubber tube and the tube of sand-paper, to prevent the sand from cutting the rubber.

What I claim as new, and desire to secure by Letters Patent of the United States, is—

1. In a sandpapering or buffing machine, the tube or hollow cylinder O of sand-paper, constructed substantially as described.

2. In a sandpapering or buffing machine, the combination of a tube of sand-paper, or equivalent material, with a core or foundation therefor made of rubber or other suitable elastic material, arranged to be compressed endwise, and thereby expanded transversely, substantially as described, for the purpose specified.

3. The combination of the shaft F, the collars J J, the nut N, the rubber tube L, and the tube of sand-paper, or equivalent material, arranged as described, for the purpose specified.

Executed at Athol, Massachusetts, this 2d day of April, 1874.

H. L. HAPGOOD.

Witnesses:

THOMAS H. GOODSPEED,

WILLIE R. BEMIS.